United States Patent [19]

Nitschke

[11] 4,441,907

[45] Apr. 10, 1984

[54] APPARATUS AND METHOD FOR LOCALLY HEATING CONVEYED GLASS SHEETS

[75] Inventor: John S. Nitschke, Perrysburg, Ohio

[73] Assignee: Glasstech, Inc., Perrysburg, Ohio

[21] Appl. No.: 410,100

[22] Filed: Aug. 20, 1982

[51] Int. Cl.³ .............................................. C03B 23/02
[52] U.S. Cl. ........................................ 65/106; 65/104;
65/273; 65/287; 65/288
[58] Field of Search ................ 65/104, 106, 107, 273, 65/288, 287, 114

[56] References Cited

U.S. PATENT DOCUMENTS

| | | | |
|---|---|---|---|
| 3,253,898 | 5/1966 | Leflet, Jr. .......................... | 65/107 X |
| 4,072,493 | 2/1978 | Imler ................................. | 65/288 X |
| 4,157,254 | 6/1979 | Thomas et al. ................... | 65/288 X |

Primary Examiner—Arthur D. Kellogg
Attorney, Agent, or Firm—Brooks & Kushman

[57] ABSTRACT

An improved apparatus including a localized heater that moves along the direction of conveyance with conveyed glass sheets to provide localized heating of a portion of each glass sheet to be bent without heating the rest of the glass sheet prior to its subsequent treatment. This invention is especially suitable for locally heating designated portions of glass sheets as they are heated while being conveyed through a furnace on a horizontal roller conveyor where the designated portion of glass sheets are to be formed with bends having relatively short radii of curvature at a bending station. The apparatus includes a pair of elongated localized gas heaters, each of which is positioned above the portion of the glass sheet which requires significant bending. These heaters are mounted on a carriage driven by a drive mechanism. The drive mechanism causes the carriage to move along a path parallel to the path of glass sheet conveyance to allow the heaters to continuously heat the designated portions of the glass sheet between an upstream position and a downstream position of the carriage. After the carriage reaches its downstream position, the drive mechanism causes the carriage to return to its upstream position in preparation for another cycle.

14 Claims, 4 Drawing Figures

APPARATUS AND METHOD FOR LOCALLY HEATING CONVEYED GLASS SHEETS

TECHNICAL FIELD

This invention relates to apparatus and method for locally heating moving glass sheets and, in particular, to apparatus and method for locally heating moving glass sheets wherein it is desirable that selected portions of the glass sheets are at a higher temperature than the rest of the glass sheet at the time of further glass processing, such as shaping the glass sheets.

BACKGROUND ART

Bent and tempered glass is used extensively for vehicle side and rear windows to provide good resistance to breakage as well as to provide an aesthetically appealing shape to complement the design of the vehicle. In order to perform the bending and tempering, the glass sheet must be heated to its deformation point of about 1200° F. and then bent to the required shape before being rapidly cooled in order to temper the glass. Tempering greatly increases the mechanical strength of the glass and its resistance to breakage as well as causing the glass to break into relatively small, dull pieces when broken, instead of large sharp slivers as in the case of untempered glass.

In U.S. Pat. No. 4,282,026 entitled "Apparatus for Bending and Tempering Glass", the entire disclosure of which is hereby incorporated by reference, a glass transport apparatus disclosed includes a furnace with a housing that defines a heating chamber in which glass is heated during conveyance along a roller hearth conveyor. Side slots extend through the furnace housing through which ends of elongated conveyor rolls project outwardly from the heating chamber. Continuous drive loops in the form of either chains or solid steel belts support the ends of the conveyor rolls and are slidably driven over external support surfaces extending alongside the slots to support and frictionally drive the rolls. A vacuum holder is positioned within the heating chamber above the conveyor rolls and has a downwardly facing inner surface with restricted openings spaced thereover. A vacuum is drawn within the restricted openings to receive the heated sheet of glass from the conveyor in preparation for bending. After the sheet of glass is supported on the vacuum holder a carrier mold, preferably in the form of a curved ring, is moved under the glass. Termination of the vacuum then drops the sheet of glass onto the mold ring so that the glass sags within the furnace heating chamber under the bias of gravity from its planar condition to the curved shape of the ring. The mold ring may be changed to bend different size glass to different shapes.

It is often desirable to bend some portions of the glass sheet a greater amount than other portions. Bends having a relatively small radius of curvature are most easily accomplished by heating the glass sheet to a temperature higher than that normally achieved by single conveyance through a heating chamber. If the overall temperature of the heating chamber is raised, then those portions of the rest of the glass sheet which are not so bent, are excessively heated, thereby creating excessive distortion.

Stationary auxiliary heaters may be located adjacent the plane of glass conveyance. For example, the U.S. patent to Dean et al U.S. Pat. No. 3,273,988 discloses burners which are positioned to provide localized heating of the peripheral edges of glass sheets in order to provide a hermetically sealed dual glass glazing unit. However, with a stationary heater, the only type of localized heat that can be applied to a glass sheet is a strip along the direction of conveyance.

Prior patents disclose various movable burners or heaters for localized heating. For example, the U.S. patent of Babcock U.S. Pat. No. 3,440,031 discloses movable burners that are utilized to heat peripheral edges of a pair of glass sheets. Stationary burners are also provided to locally heat straight side edges of the glass sheets. Vertically movable burners are also disclosed to provide localized heating of the curved edges of the pair of glass sheets.

Likewise, the U.S. patent of Olsen et al U.S. Pat. No. 2,964,105 discloses angularly adjustable burners which may also be laterally adjusted.

The U.S. patent of Vranken U.S. Pat. No. 3,248,517 discloses a bending system which includes upper heaters that are movable vertically and side heaters that are moved horizontally to provide local heating.

A glass tube making machine is disclosed by the U.S. patent of Hamilton U.S. Pat. No. 3,249,414 which includes a heater mounted on a carriage for movement along the elongated direction of the bed of a lathe on which glass tubes are formed.

In the U.S. patent of Keefer U.S. Pat. No. 3,395,008 burners are supported for both horizontal and vertical movement in order to provide glazing of glass articles to remove surface defects.

A machine disclosed by U.S. patent of Anderson U.S. Pat. No. 3,488,176 includes burners that are moved between various positions during manufacturing of glass tube stems.

The U.S. patent of Dichter U.S. Pat. No. 3,874,867 discloses a vial producing machine whose burner is supported for movement between two positions during manufacturing of a glass vial.

The U.S. patent of Harker U.S. Pat. No. 2,494,387 discloses a machine including burners that are moved so as to direct heat toward tubular glass blanks that are conveyed in a circular path by a conveyor. The movable heater is to reduce fuel usage.

With certain glass sheets to be bent it is desirable to locally heat at least one strip portion of each glass sheet which extends transverse the direction of conveyance without heating the rest of the sheet. This localized heating must be performed in an environment of high furnace temperature and must keep up with the rapid rates of glass sheet production.

DISCLOSURE OF THE INVENTION

An object of the present invention is to provide an improved apparatus including a localized heater that moves along the direction of conveyance with a conveyed glass sheet to provide localized heating of a portion to be bent without significantly heating the rest of the glass sheet.

Another object of the present invention is to provide an improved method for heating selected portions of a plurality of spaced apart glass sheets as the glass sheets are moved by a horizontal conveyor toward a glass sheet treatment station without significantly heating the rest of each of the glass sheets.

In carrying out the above objects and other objects in a glass sheet bending system including a heating chamber, a conveyor for conveying glass sheets through the heating chamber for heating to a sufficiently high temperature for bending, and a bending station for bending heated glass sheets, the improvement comprises at least one localized heater for providing localized heating of each glass sheet transverse the direction of conveyance and an actuator for moving the heater along with each glass sheet in the direction of conveyance at preferably the same speed as the glasss sheet being conveyed on the conveyor such that only certain portions of the glass sheet are locally heated.

Further in carrying out the above objects and other objects in a glass sheet bending system including a heating chamber, a conveyor for conveying glass sheets through the heating chamber for heating to a sufficiently high temperature for bending and a bending station for bending the heated glass sheets, a method is provided for facilitating the bending of a strip portion of each glass sheet extending transverse the direction of conveyance, without interrupting movement of the glass sheets wherein the method includes the step of heating the strip portion of each of the conveyed glass sheets between an upstream position and a downstream position on the conveyor to a temperature higher than the temperature of the rest of the glass sheet prior to bending at the bending station.

Preferably, a localized heater is provided for each portion of the glass sheet which is to be bent substantially more than the other portions of the glass sheet.

The actuator preferably includes a carriage provided with a plurality of localized heaters. The carriage is movable along the exterior path between an upstream position and a downstream position. The actuator also preferably includes a drive mechanism for driving the carriage downstream in unison with movement of the glass sheets between the upstream position and the downstream position at a speed equal to the speed of movement of the glass sheets. The heaters move with each glass sheet so that the heaters are disposed immediately above the portions of the glass sheet which are to receive the additional heat. The drive mechanism thereafter moves the carriage to the upstream position of the carriage in preparation for another cycle.

The objects, features and advantages of the present invention are readily apparent from the following detailed description of the best mode for carrying out the invention taken in connection with the accompanying drawings.

BEST MODE FOR CARRYING OUT THE INVENTION

The apparatus of the present invention is especially designed to provide localized heating of certain portions of glass sheets as they travel on a conveyor and before they enter a bending station of the type depicted in the above-mentioned patent entitled "Apparatus for Bending and Tempering Glass".

Figure 1:
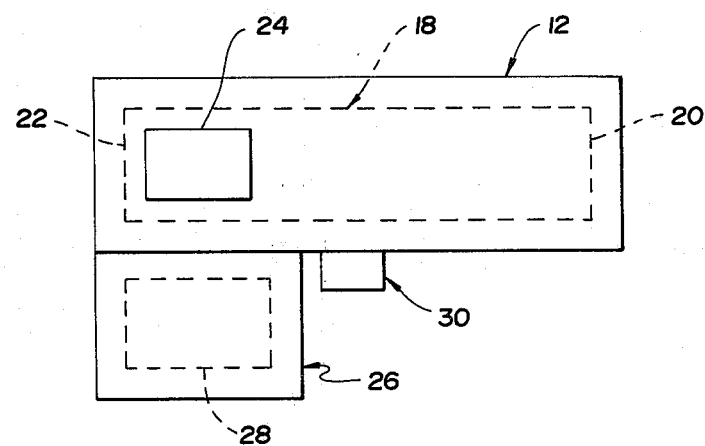
FIG. 1 is a plan schematic view showing the position of the apparatus constructed according to the present invention with respect to a glass bending and tempering apparatus.
Figure 2:
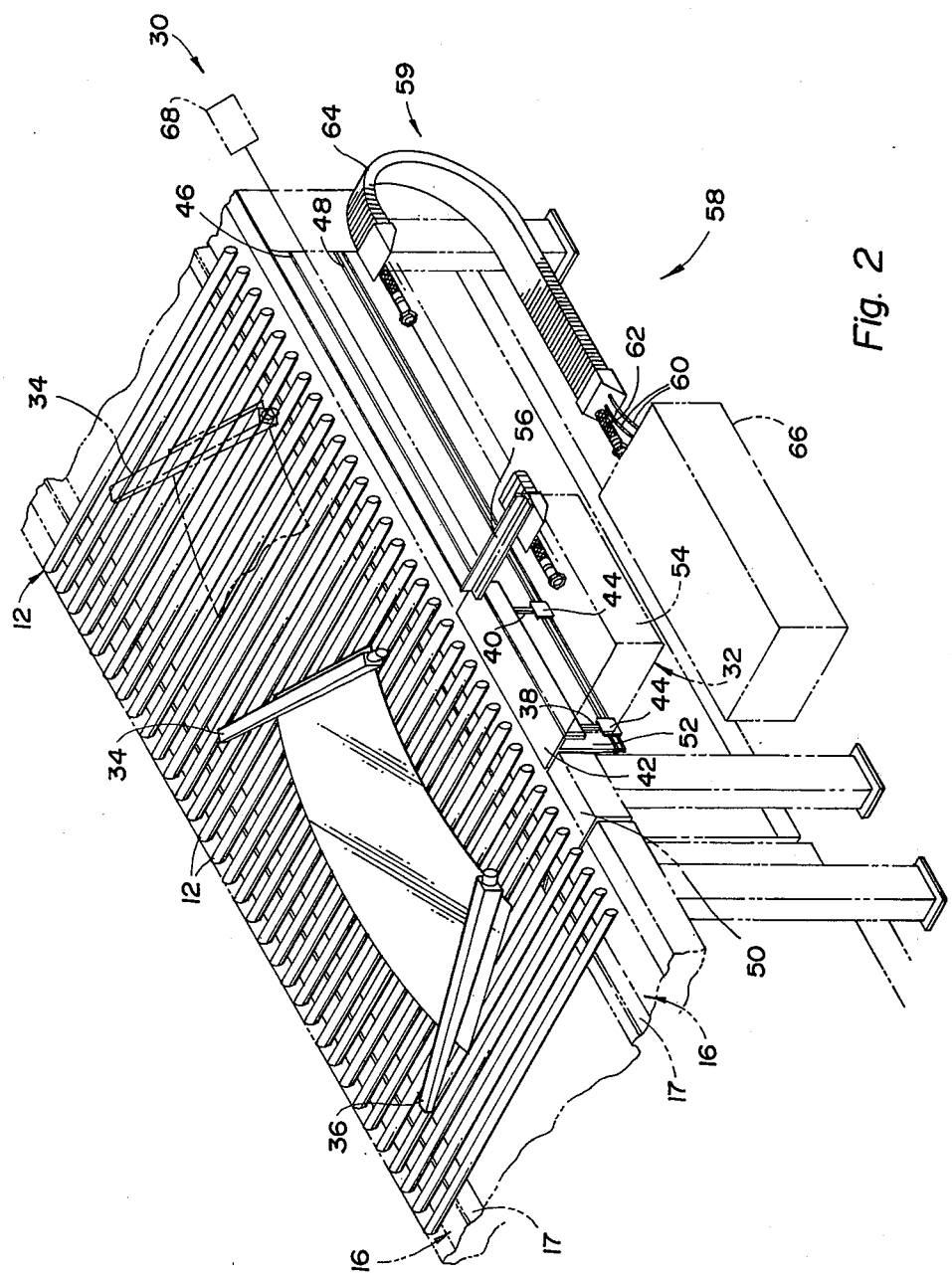
FIG. 2 is a fragmentary perspective view showing a localized heater in its upstream position in phantom and in its downstream position.

Referring to the drawings, FIG. 1 schematically discloses a glass bending and tempering apparatus collectively indicated by reference numeral 10. The apparatus 10 includes a conveyor 12. As shown in FIG. 2, the conveyor 12 includes a plurality of conveyor rolls 14 of fused silica particles that are sinter-bonded to each other. The conveyor 12 also includes a pair of continuous drive loops or chains 16. Each of the drive loops 16 has an upper reach 17 and a lower reach (not shown). The upper reach 17 frictionally drives the ends of the rolls 14.

The apparatus 10 also includes a furnace 18. One end 20 of the furnace 18 receives discrete sheets of glass to be bent and tempered while the other end 22 of the furnace 18 has provisions for bending the glass once it is heated including vacuum holder 24 which is positioned within the furnace heating chamber at the end 22 of the furnace 18. The vacuum holder 24 which is more fully described in the above-referenced patent "Apparatus for Bending and Tempering Glass" receives the sheet of glass at a glass pick-up station by use of a vacuum.

The apparatus 10 also includes a quench unit 26 which is positioned laterally adjacent one side of the end 22 of the furnace 18 and receives the heated and bent glass to provide tempering thereof in a manner that is likewise described in the above-referenced patent "Apparatus for Bending and Tempering Glass". It is also possible for the quench unit 26 to be positioned at the other side of the furnace end 22 or at its longitudinal end. The quench unit 26 includes blastheads 28 which provide cooling air at the opposite surfaces of the bent glass. The blastheads are preferably of the type disclosed in the U.S. Pat. No. 3,936,291, the entire disclosure of which is hereby incorporated herein by reference.

A heating apparatus or localized heating mechanism of the apparatus 10 is generally indicated at 30 and is located on one side of the conveyor 12 downstream from the first end 20 of the furnace 18 and upstream from the vacuum holder 24.

Figure 3:
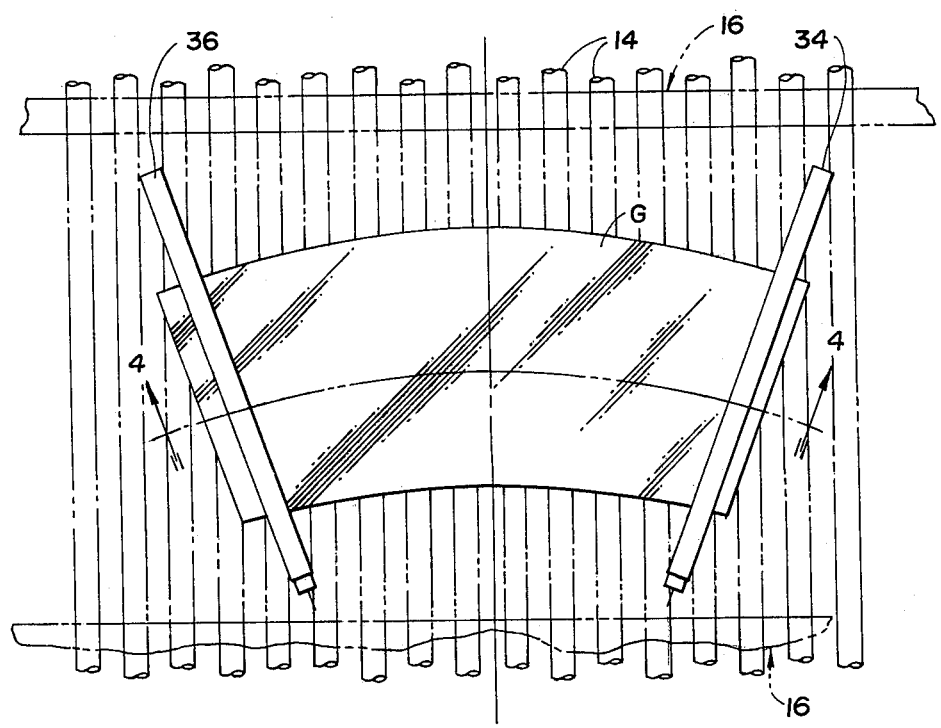
FIG. 3 is a plan fragmentary view illustrating the operational position of a pair of localized heaters.

Referring now to FIGS. 2 and 3, each of the conveyor rolls 14 projects outwardly through a side slot (not shown) of the furnace 18. Each upper reach of the drive loops 16 is slidably driven over upwardly facing support surfaces or support members (not shown). The smooth side of the chain 16 supports the rolls 14 as the chain 16 is slidably driven along an upwardly facing surface of the support member associated with opposite sides of the conveyor 12 and which extend in a longitudinal direction with respect to the conveyor 12. Frictional engagement between the rolls 14 and the drive chain 16 at its upper reach 17 causes a counterclockwise rotation of the rolls 14 so as to convey the sheets of glass G to the left as shown in FIG. 2. U.S. Pat. Nos. 3,806,312, 3,934,970, 3,947,242 and 3,994,711 disclose this type of frictional roll drive mechanism and the entire disclosures thereof are hereby incorporated herein by reference.

The localized heating mechanism 30 includes a transfer carriage 32 on which a pair of elongated glass sheet strip heaters, namely an upstream glass heater 34 and a downstream glass heater 36 are mounted. Each of the heaters 34 and 36 has a suitable gas burner mounted therein which burns an air-gas mixture to heat those portions of the sheet which are immediately below the heaters. The transfer carrier 32 is located on one side of the furnace 18 at a localized sheet heating station as shown in FIGS. 1 and 2.

The carriage 32 includes a pair of vertical frame members 38 and 40 which are spaced apart and interconnected by an L-shaped horizontal frame member 42 at the upper ends of the vertical frame members 38 and 40. Each of the vertical frame members 38 and 40 is fixedly connected, such as by welding or by bolts, to a pair of vertically spaced blocks, only the lower ones of which are shown in FIGS. 2 at 44. Each of the blocks 44 is movably mounted on a pair of vertically spaced, parallel, support shafts or alignment rails 46 and 48, respectively. The alignment rails 46 and 48 are mounted to a horizontal beam 50 of the conveyor by a vertical suport plate 52 which is mounted to the horizontal beam 50 such as by welding. The alignment rails 46 and 48 are fixedly secured to the plate 52 by a plurality of bolts (not shown) which extend through the plate 52, and into their respective alignment rails 46 and 48.

With reference to FIG. 2, the carriage 32 has mounted thereon a rectangular housing member 54. The housing member 54 is mounted on the frame member 42 by a second frame member 46 which is welded to the housing member 54 and the frame member 42.

The housing member 54 contains various pipes, valves and control devices which form that part of a gas-air pipeline generally indicated at 58 which mixes gas and air from a flexible portion 59 of the pipeline 58 to the heaters 34 and 36.

The flexible portion 59 of the pipeline 58 comprises a pair of flexible air hoses 60 and a flexible gas cable 62 carried by a flexible cable and hose carrier 64. The carrier 64 allows the hoses 60 and the cable 62 to bend without pinching off the flow of air and gas respectively therein as the carriage 32 moves relative to a stationary gas and air controller contained within a stationary housing member 66. The controller forms that part of the pipeline 58 which is adapted to receive gas and pressurized air and also includes various gas and air pipes, valves and control devices.

With reference to FIG. 2, a drive mechanism for moving the carriage 32 between its upstream and downstream positions is schematically illustrated at 68. While the particular construction of the drive mechanism 68 is not particularly important to the operation of the present invention, a mechanism for performing its function is described immediately hereinbelow.

The drive mechanism 68 may include a pair of drive motors, each having an output shaft on which a drive sprocket is mounted. The drive sprockets are connected by a roller chain, the free ends of which are connected to the carriage 32 so that when energized in a controlled fashion, the drive motors will alternately drive the carriage 32 downstream at the same speed of glass sheet conveyance or move the carriage upstream until the upstream position of the carriage is reached.

Figure 4:
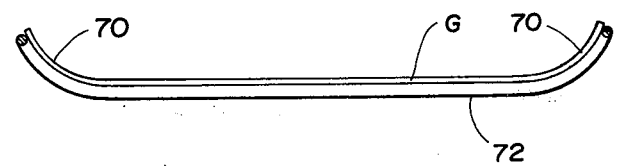
FIG. 4 is a side elevational view taken along line 4—4 of FIG. 3 through the glass sheet as thereafter bent by a bending mold.

The apparatus 30 operates as follows. When a glass sheet G is sensed in the furnace 18, and when the sheet of glass G is in the position indicated by the phantom lines as shown in FIG. 2, one drive motor of the drive mechanism 68 is actuated to move the carriage 32 from its upstream position at the same speed as the glass sheet moves along the conveyor 12. This is accomplished through its associated drive sprocket and the chain to move the carriage 32 along the support shafts 46 and 48. As the carriage 32 moves downstream, the movement of the carriage 32 tracks the movement of glass G and allows the heaters 34 and 36 to locally heat those portions 70 of the glass G which are to have the smallest radius of curvature (i.e. those portions which are to be bent the most on the bending mold 72 as shown in FIG. 4).

After the carriage 32 reaches it downstream position as shown in FIG. 2, the other drive motor of the drive mechanism 68 and its associated drive sprocket and the roller chain pulls the carriage 32 along the support shafts 46 and 48 to its upstream position to await the arrival of the next glass sheet. When the next glass sheet is sensed, and the subsequent glass sheet is in the position indicated by the phantom lines in FIG. 2, the drive mechanism 68 is again so actuated to start the next cycle.

The invention has been described in an illustrative manner and it is to be understood that the terminology which has been used is intended to be in the nature of words of description rather than of limitation. Many modifications and variations of the present invention are possible in light of the above teachings. It is therefore to be understood that within the scope of the appended claims the invention may be practiced otherwise than as specifically described.

What is claimed is:

1. In a glass sheet bending system including a heating chamber, a conveyor for conveying glass sheets through the heating chamber from an upstream position to a downstream position for heating to a sufficiently high temperature for bending, and a bending station for bending heated glass sheets, the improvement comprising:

a localized heater mounted for movement relative to and independent of the conveyed glass sheet for providing localized heating of each glass sheet transverse the direction of conveyance as the glass sheet moves from the upstream position to the downstream position; and an actuator for moving the heater to track each glass sheet in the direction of conveyance from the upstream position to the downstream position.

2. Apparatus for locally heating selected portions of a glass sheet as the glass sheet is moved by a conveyor from an upstream position to a downstream position toward a glass sheet treatment station where it is desirable to have the selected portions of the glass sheet at a higher temperature than the rest of the glass sheet, said apparatus comprising:

a carriage movable relative to and independent of the conveyed glass sheet between the upstream position and the downstream position along the path of glass sheet conveyance, at least one localized heater carried by said carriage for heating the selected portions of glass sheet as the glass sheet moves from the upstream position to its downstream position, and a drive mechanism for driving the carriage from the upstream position to the downstream position to track the glass sheet being conveyed on the conveyor such that the localized heater heats the selected portions of the glass sheet transverse the direction of conveyance between the upstream position and the downstream position, said drive mechanism thereafter moving the carriage from said downstream position back to said upstream position in preparation for another cycle.

3. Apparatus for locally heating selected portions of a glass sheet as the glass sheet is moved by a horizontal conveyor having rigid, sheet engaging conveyor rolls from an upstream position to a downstream position, toward a glass sheet bending station where it is desirable to have a plurality of selected portions of the glass sheet at a higher temperature than the rest of the glass sheet, said apparatus comprising:

a carriage movable relative to and independent of the conveyed glass sheet between the upstream position and the downstream position along the path of glass sheet conveyance, a like plurality of localized heaters carried by said carriage in spaced relation relative to said path of glass sheet conveyance, and a drive mechanism for driving the carriage from the upstream position to said downstream position to track the glass sheet being conveyed on the conveyor such that the localized heaters heat the selection portions of the glass sheet transverse the direction of conveyance between the upstream position and the downstream position, said drive mechanism thereafter moving the carriage from said downstream position back to said upstream position in preparation for another cycle.

4. The apparatus as claimed in claim 2 or claim 3 including at least one elongated slide member mounted to the conveyor on one side thereof, said carriage being slidably mounted on said slide member to move thereon.

5. The invention as claimed in claim 1, claim 2 or claim 3 wherein said heater comprises a gas heater and further comprises a pipeline including a flexible carrier for carrying a part of the pipeline therein to permit movement of the pipeline, said pipeline being fluidly connected to said heater at one end thereof and adapted to receive gas at the opposite end thereof.

6. In a glass sheet bending system including a conveyor for conveying glass sheets through a heating chamber from an upstream position to a downstream position for heating to a sufficiently high temperature for bending, and a bending station for bending heated glass sheets, a method for facilitating the bending of a strip portion of each glass sheet extending transverse the direction of conveyance without interrupting movement of the glass sheets, the method comprising:

tracking the strip portion of each of the conveyed glass sheets between the upstream position and the downstream position on the conveyor with a localized heater movable relative to and independent of the conveyed glass sheet so that the localized heater heats the strip portion to a temperature higher than the temperature of the rest of the glass sheet prior to bending at the bending station.

7. In a glass bending system including a conveyor for conveying glass sheets through a heating chamber for heating to a sufficiently high temperature for bending, and a bending station for bending heated glass sheets, a method for locally heating selected portions of the glass sheets extending transverse the direction of conveyance, the method comprising the steps of:

positioning a heater movable relative to and independent of the glass sheets at an upstream position.

tracking a glass sheet with the heater along the direction of conveyance from the upstream position to a downstream position so that heat from the heater is directed to the selected portion without significantly heating the rest of the glass sheet, and returning the heater from the downstream position to the upstream position in preparation for another cycle.

8. In a glass sheet bending system including a heating chamber, a conveyor for conveying glass sheets through the heating chamber from an upstream position to a downstream position for heating to a sufficiently high temperature for bending, and a bending station for bending heated glass sheets, the improvement comprising:

a localized heater mounted for movement relative to and independent of the conveyed glass sheet for providing localized heating of each glass sheet as the glass sheet moves from the upstream position to the downstream position; and an actuator for moving the heater to track each glass sheet from the upstream to the downstream position to provide localized heating of each glass sheet.

9. The system as claimed in claim 8 wherein said actuator comprises a carriage movable between the upstream position and the downstream position along the path of glass sheet conveyance and wherein the carriage is movable relative to and independent of the conveyed glass sheet.

10. The system as claimed in claim 9 wherein said actuator includes a drive mechanism for driving the carriage from the upstream position to the downstream position to track the glass sheet being conveyed on the conveyor such that the localized heater heats the selected portions of the glass sheet transverse the direction of conveyance between the upstream position and the downstream position, said drive mechanism thereafter moving the carriage from the downstream position back to the upstream position in preparation for another cycle.

11. The system as claimed in claim 9 including a second localized heater carried by the carriage in spaced relation relative to the path of glass sheet conveyance to locally heat two selected portions of the glass sheet.

12. The system as claimed in claim 8, claim 9 or claim 10 wherein said heater comprises a gas heater and further comprises a pipeline including a flexible carriage for carrying a part of the pipeline therein to permit movement of the pipeline, said pipeline being fluidly connected to said heater at one end thereof and adapted to receive gas at the opposite end thereof.

13. In a glass sheet bending system including a conveyor for conveying glass sheets through a heating chamber from an upstream position to a downstream position for heating to a sufficiently high temperature for crease bending, and a bending station for crease bending heated glass sheets, a method for facilitating the bending of a crease portion of each glass sheet without interrupting movement of the glass sheets, the method comprising:

tracking to crease portion of end of the conveyed glass sheets between the upstream position and the downstream position on the conveyor with a localized heater movable relative to and independent of the conveyed glass sheet so that the localized heater heats the crease portion to a temperature higher than the temperature of the rest of the glass sheet prior to crease bending at the bending station.

14. The method as claimed in claim 13 wherein the method further includes the step of:

returning the heater from the downstream position to the upstream position in preparation for another cycle.

* * * * *